(12) United States Patent
Benarous

(10) Patent No.: US 10,958,116 B2
(45) Date of Patent: Mar. 23, 2021

(54) DAMPED ELECTRIC MOTOR

(71) Applicant: Goodrich Actuation Systems Limited, Solihull (GB)

(72) Inventor: Maamar Benarous, Coventry (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 49 days.

(21) Appl. No.: 16/117,021

(22) Filed: Aug. 30, 2018

(65) Prior Publication Data
US 2019/0165621 A1 May 30, 2019

(30) Foreign Application Priority Data

Nov. 24, 2017 (EP) ..................................... 17203647

(51) Int. Cl.
*H02K 1/14* (2006.01)
*H02K 1/16* (2006.01)
(Continued)

(52) U.S. Cl.
CPC ............. *H02K 1/185* (2013.01); *H02K 1/146* (2013.01); *H02K 1/16* (2013.01); *H02K 1/278* (2013.01);
(Continued)

(58) Field of Classification Search
CPC .......... H02K 1/16; H02K 1/165; H02K 1/278; H02K 3/14; H02K 3/146; H02K 3/148;
(Continued)

(56) References Cited

U.S. PATENT DOCUMENTS 2,831,133 A 4/1998 Hansen et al.
9,068,623 B2 6/2015 Gysen et al.
(Continued)

FOREIGN PATENT DOCUMENTS

EP 3086445 A1 10/2016
JP S6038048 U 3/1985
(Continued)

OTHER PUBLICATIONS

Extended European Search Report for International Application No. 17203647.7 dated May 16, 2018, 8 pages.

*Primary Examiner* — Quyen P Leung
*Assistant Examiner* — Eric Johnson
(74) *Attorney, Agent, or Firm* — Cantor Colburn LLP

(57) ABSTRACT

An electric motor and a method of making the electric motor is disclosed herein. The motor comprises a stator and a rotor being arranged coaxially, with said rotor provided internally of said stator. The stator having one or more stator teeth extending radially inwardly towards said rotor. The rotor has a plurality of magnets forming an outer rotor surface. A first face of the or each stator tooth faces the outer rotor surface. An electrically-conductive non-magnetic damper bar is partially embedded in the or each stator tooth, the or each damper bar having an outer damper bar surface. A groove is formed in the first face of the or each stator tooth to at least partially expose the outer damper bar surface. The groove can improve flux linkage between the rotor and the damper bars and thus improve the damping of the electric motor.

14 Claims, 6 Drawing Sheets

(51) Int. Cl.
*H02K 1/18* (2006.01)
*H02K 3/20* (2006.01)
*H02K 3/16* (2006.01)
*H02K 1/27* (2006.01)
*H02K 5/24* (2006.01)
*H02K 15/16* (2006.01)

(52) U.S. Cl.
CPC ............... *H02K 3/16* (2013.01); *H02K 3/20* (2013.01); *H02K 5/24* (2013.01); *H02K 15/16* (2013.01)

(58) Field of Classification Search
CPC .. H02K 3/16; H02K 3/20; H02K 7/32; H02K 7/10; H02K 7/104; H02K 7/106; H02K 49/02; H02K 49/04; H02K 49/043; H02K 1/146; H02K 1/185; H02K 3/18
USPC .................................. 310/183, 197, 210–211
See application file for complete search history.

(56) References Cited

U.S. PATENT DOCUMENTS

| | | | |
|---|---|---|---|
| 2005/0046304 A1* | 3/2005 | Tamaki | H02K 21/046 310/254.1 |
| 2012/0086288 A1* | 4/2012 | Tanaka | H02K 1/246 310/46 |
| 2013/0313939 A1* | 11/2013 | Hiramitsu | H02K 3/34 310/195 |
| 2014/0292134 A1 | 10/2014 | Tsuda et al. | |
| 2016/0294252 A1 | 10/2016 | Whiteley et al. | |
| 2016/0315515 A1* | 10/2016 | Benarous | H02K 3/48 |
| 2016/0315519 A1 | 10/2016 | Benarous | |
| 2017/0207673 A1* | 7/2017 | Kinjo | H02K 3/28 |

FOREIGN PATENT DOCUMENTS

| | | |
|---|---|---|
| JP | 2005106242 A | 4/2005 |
| WO | 2010064978 A1 | 6/2010 |

* cited by examiner

DAMPED ELECTRIC MOTOR

FOREIGN PRIORITY

This application claims priority to European Patent Application No. 17203647.7 filed Nov. 24, 2017, the entire contents of which is incorporated herein by reference.

TECHNICAL FIELD

The present disclosure relates to an electric motor having damper bars and a method for making the same. The electric motor may be particularly for use in an aircraft or other vehicle or device that may use an electric motor.

BACKGROUND

Electrical motors may be used to actuate parts of a vehicle, such as steering wheels of the vehicle, for example. In such electric motors, it is often desirable to have a damping force. The damping force may be used, for example, to prevent 'shimmying' of the wheels. Shimmying is the word used to describe quick oscillation of steerable wheels about their direction of travel. The amplitude of these oscillations can quickly grow and cause instability of the vehicle.

In aircraft, shimmying can occur in the landing gear wheels. Other undesirable oscillations can occur in ailerons, slats, or flaps of the aircraft. In the past, when these parts were controlled by hydraulic means, hydraulic damping systems were employed. In recent years, there has been a move towards "all-electric" aircraft that do not use hydraulic systems for e.g. landing gears or controlling ailerons, flaps, or slats. Electric motors require different systems to perform the damping from those systems used in hydraulics.

To provide the damping force in electric motors, it is known to provide damper bars fixed relative to the stator of the electric motor. Damper bars are electrically conductive and consequently, when the motor turns, the magnets of the rotor induce currents in the damper bars which resist the turning of the rotor. This provides a damping force that varies with the speed of rotation of the rotor.

When oscillations occur in the part being controlled, e.g. shimmying of the landing gear wheels, the rotor is urged to rotate within the stator. The magnetic field from the magnets on the rotor thus induces currents in the damper bars and these currents set up a reaction force against the direction of motion of the rotor magnets and thus damp the shimmying of the wheels of the vehicle.

Such conventional damped electric motors have generally been considered satisfactory for their intended purpose. However, it is desirable to improve the cost, weight, and/or manufacturability of damped electric motors.

In known electric motors, such as those described in U.S. Pat. No. 9,068,623 and WO 2010/064978 A1 the damper bars are disposed outside the stator tooth/teeth.

SUMMARY OF INVENTION

According to a first aspect, the examples described herein provide an electric motor comprising: a stator having one or more stator teeth; a rotor having a plurality of magnets forming a rotor surface; wherein a first face of the or each stator tooth faces the rotor surface, and an electrically-conductive non-magnetic damper bar embedded in the or each stator tooth, the or each damper bar having a damper bar surface; wherein a groove is formed in the first face of the or each stator tooth to at least partially expose the damper bar therein.

The groove can increase the flux linkage between the magnets of the rotor and the damper bars. This may allow, for the same size of damper bar, increased damping in the electric motor compared to electric motors without the aforesaid groove. Alternatively, a smaller size of damper bar may be used in an electric motor having the aforesaid groove, to provide the same amount of damping as an electric motor without said groove.

In at least some of the examples described herein, the presence of the groove increases the maximum damping torque by at least twofold, and preferably at least threefold, compared to an otherwise identical electrical motor without the groove.

In some examples, the groove may be formed such that there is a line-of-sight between a portion of the exposed damper bar surface and a portion of the rotor surface. That is, the groove may be formed such that a straight line may be drawn from the exposed portion of the damper bar to the rotor surface, wherein the line does not intersect the material of the stator tooth in which the damper bar is embedded.

In some examples, there are a plurality of stator teeth and the motor may further comprise an electrical conductor connected to each of the damper bars. The electrical conductor may be a conductive ring located at an axial end of the stator. The ring may have the same shape as the stator tooth profile in order to not interfere with the stator end winding.

The or each groove may be sized so as to expose between 1% and 49% of the surface of the cross-section of the damper bar. That is, when the damper bar is viewed along its longitudinal axis, the stator tooth may enclose between 1% and 49% of the length of the perimeter of the cross-section of the damper bar. Increasing the amount of exposed surface of the damper bar increases the drag torque up to a limit.

In some examples, the size of the groove may determine how much of the surface of the damper bar is exposed.

The rotor may be configured to rotate around a central axis of rotation R, wherein the stator teeth extend radially inwards towards the central axis of rotation, and wherein the longitudinal axis of each damper bar extends in a direction that is parallel to the axis of rotation. The longitudinal axis of the damper bar may extend in a direction that is perpendicular to the radial direction of the rotor.

The groove may extend along only a small portion of the length of the longitudinal axis of the bar. For example, the groove may comprise a hole formed in the stator tooth that exposes a portion of the damper bar. In some examples, the groove may extend longitudinally along more than 30% of the length along the longitudinal axis of the damper bar. In some examples, the groove may extend longitudinally more than 50% of the length of the longitudinal axis of the damper bar. Preferably, the groove extends more than 90% of the length of the long axis of the damper bar. In these examples, having the groove extend less than the entire length of the damper bar can provide some mechanical robustness in high vibration environments. For example, the damper bar could be fully enclosed by the stator tooth for 5% of its length at one end of the damper bar, and 5% of its length at the other end of the damper bar, while the groove extends for the remaining 90% of the length of the damper bar. In other examples, the groove extends for the entire length of the damper bar.

A first portion of the outer surface of each damper bar may be surrounded by, or enclosed by the stator tooth in which it is embedded, with a second portion being the exposed portion of the damper bar that is facing the rotor. In other words, the damper bar may be surrounded by the stator tooth with which it is associated, with only the groove section being exposed.

In some examples, one or more end portions of the damper bar may be connected to the electrical conductor. This allows the stator tooth to provide support and positioning for the damper bar within the electric motor.

Each stator tooth may have a central longitudinal axis (the axis extending inward radially towards the rotor). In some examples, this axis may be an axis of symmetry. The damper bar may be disposed so as to intersect this axis and extend perpendicularly to this axis. In some examples, the damper bar is positioned so as to intersect this central tooth axis. In some examples, the cross-section of the damper bar is symmetrical about the central longitudinal axis of symmetry.

Alternatively, each stator tooth may have an axis of symmetry extending in the radial direction and wherein the damper bar is disposed off the axis of symmetry.

The stator and rotor may be arranged coaxially, so as to have the same central axis of rotation R. They are therefore arranged one inside the other, to define a cylindrical geometry having orthogonal radial, circumferential, and axial longitudinal directions. The or each groove may be defined by two side walls. In one example, a first of the side walls extends substantially radially towards the rotor, and wherein a second of the side walls extends at an angle, theta, to the radial direction. Theta may be between 20 and 50 degrees to the radial direction. In another example, both side walls extend substantially radially towards the rotor. In yet another example, each of the side walls extends at an angle to the radial direction, and the angles of respective side walls may be the same or different. Having a symmetrically designed groove can reduce or prevent torque ripple. The slot size and shape can influence the amount of damping torque. Thus, these two parameters may be varied when designing a desired damping torque in an electric motor.

The magnets on the rotor may each have a radially outer surface that is curved convexly in the circumferential direction. In some examples the curve may match a concave curvature of the first faces of the stator teeth. This shape can give each magnet on the rotor a shape similar to that of a loaf of bread—rectangular on all sides except for a domed top surface. The domed, convex top surface can match the corresponding concave curvature of the stator teeth. This allows a constant separation to be maintained between the faces of the stator teeth and the rotor surface (except for the presence of the groove).

The present disclosure also relates to an aircraft comprising the electric motor as described above, wherein the electric motor is connected to an aileron, a flap, or a landing gear of the aircraft.

In event of a loss of power in an aircraft, it is a requirement that landing gears can still be deployed, e.g. by falling under their own weight. The electric motor described herein may allow a landing gear to deploy under its own weight in a controlled manner. As the landing gear deploys, it turns the rotor within the (unpowered) electric motor. However, the damping effect from the damper bars is automatically induced by relative motion of the rotor and stator (i.e. it does not require the electric motor to be powered), and so the damper bars act to slow the deployment of the landing gear to avoid mechanical shocks, such as shocks to the bearings of the landing gear. That is, this design can provide a controlled free-fall of components (e.g. the landing gear) under a power-loss failure mode.

The damper bars in the electric motor may also assist in preventing shimmying or oscillation of the aileron, flap, or landing gear in use. This effect does not depend on whether the electric motor is powered or not.

The present disclosure also relates to a method of making an electric motor, the method comprising: forming a rotor and a stator having a stator tooth such that a first face of the stator tooth faces the rotor, wherein a conductive non-magnetic damper bar is embedded in the stator tooth, and forming a groove in the first face of the stator tooth to expose a portion of a surface of the damper bar.

DESCRIPTION OF THE FIGURES

Certain embodiments of the present disclosure will now be described in greater detail by way of example only and with reference to the accompanying drawings in which.

DETAILED DESCRIPTION

Figure 1:
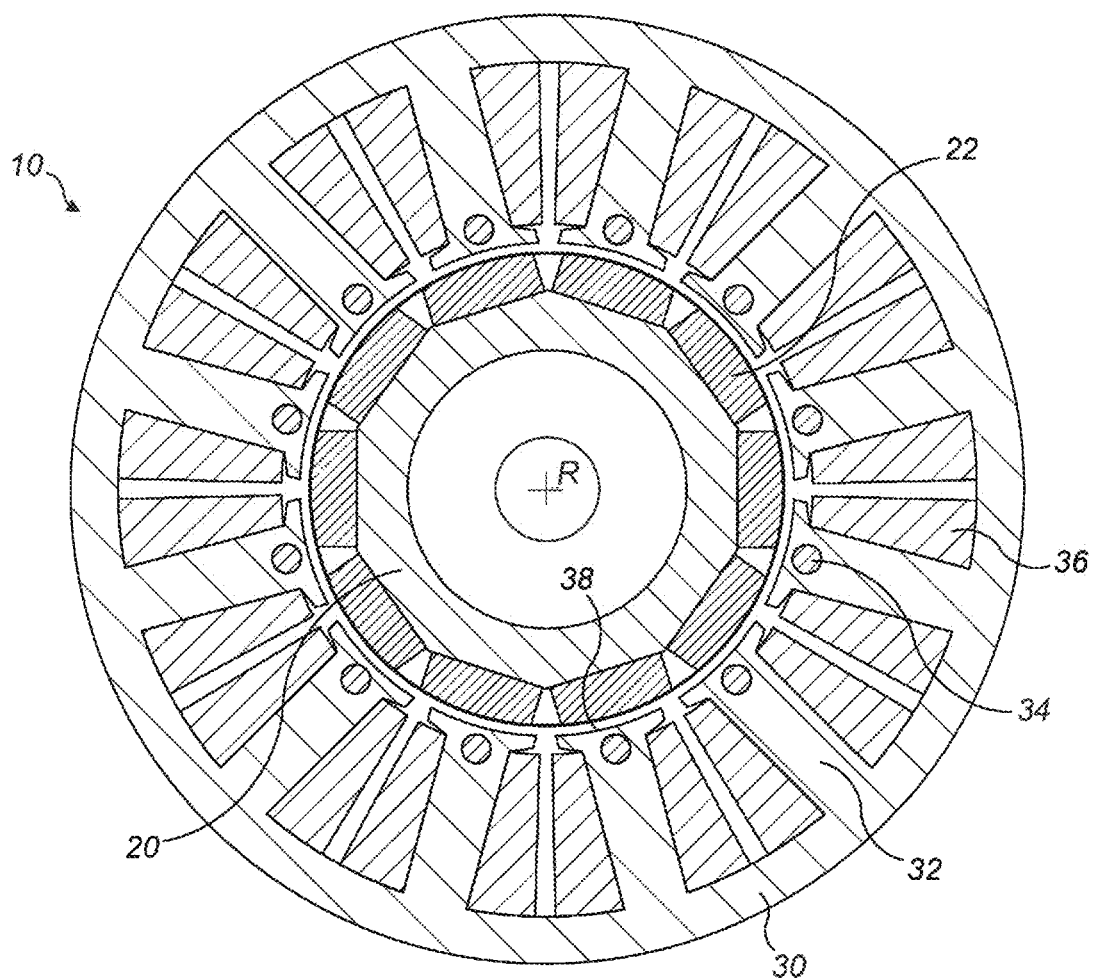
FIG. 1 shows a cross-section of a known electric motor.

FIG. 1 shows a known electric motor 10. The electric motor 10 is generally cylindrical in shape, having a generally cylindrical rotor 20 disposed concentrically and coaxially inside a generally cylindrical stator 30.

The rotor 20 has a plurality of magnets 22 provided on its outer surface. One of the magnetic poles of each magnet 22 extends substantially radially outwards from a center of the generally cylindrical rotor 20 as well as around the outer circumference of the rotor 20. Typically, a first magnet on the rotor will have the opposite pole, pointing radially outwards, to the two magnets disposed on either side of the first magnet. That is, the outward facing poles of the magnets, going around outer circumference of the rotor, alternate N, S, N, S etc.

The rotor 20 is surrounded by the stator 30 which has a plurality of stator teeth 32 arranged around the inner circumference of the stator 30. The stator teeth 32 extend radially inwards towards the rotor 20. Each stator tooth 32 has a radially innermost face 38 that faces towards the rotor 20. Windings 36 are wound around each tooth 32. When the windings 36 are supplied with electrical current, a magnetic field is formed by the windings 36 and this magnetic field interacts with the magnetic fields generated by the magnets 22 of the rotor 20 to provide force therebetween.

Each stator tooth 32 has a damper bar 34 completely embedded therein. Each damper bar 34 is made from an electrically-conductive, non-magnetic material. Each damper bar extends generally axially along the longitudinal axis of the stator 30 (i.e. along the axis of the electric motor 10). That is, each damper bar 34 has a long axis that is generally parallel to an axis of rotation of the rotor. Each damper bar 34 is located inside the stator tooth 32 close to the radially innermost face 38 of the stator tooth 32.

Figure 2:
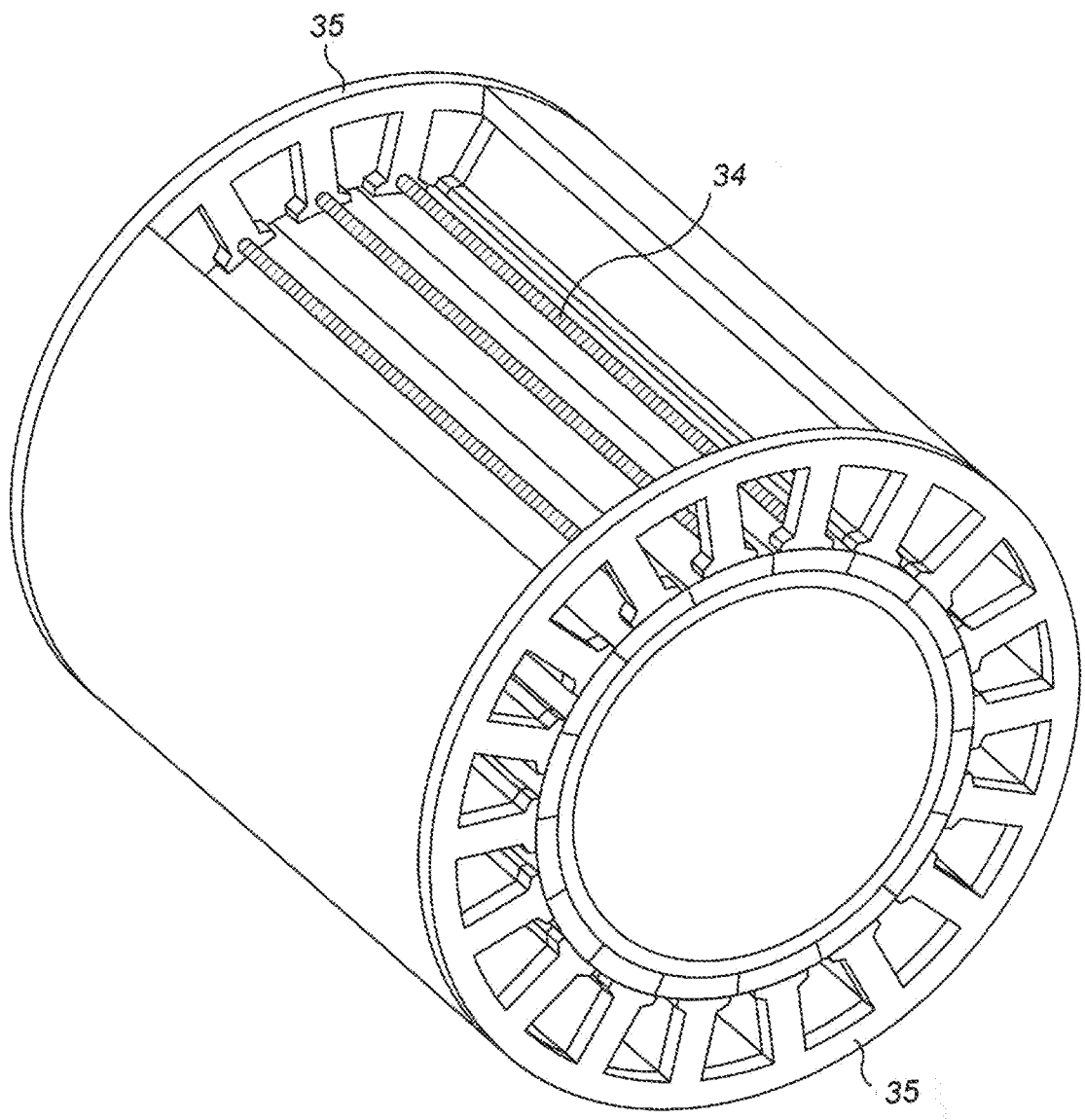
FIG. 2 shows a perspective view of a known electric motor.

The plurality of damper bars 34 are connected together by an electrically conductive element, such as a ring 35 as shown in FIG. 2. Two rings 35 may be provided, one at each end of the motor 10. Thus, each damper bar 34 connects to one ring 35 at one end and to another ring 35 at its other end. Each damper bar 34 is completely enclosed by its stator tooth 32 along the longitudinal axis of the bar except at its ends where it connects to the rings 35.

In other known electric motors, such as those described in U.S. Pat. No. 9,068,623 and WO 2010/064978 A1 the damper bars are disposed outside the stator tooth/teeth.

Figure 3B:
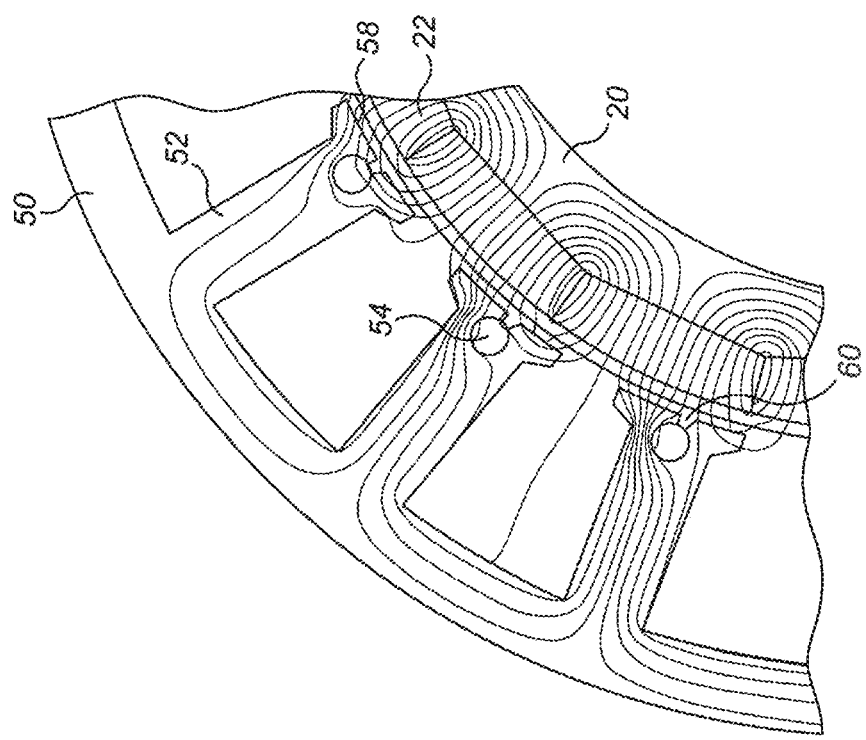
FIG. 3B shows magnetic field lines around damper bars of an electric motor according to the present disclosure.
Figure 3A:
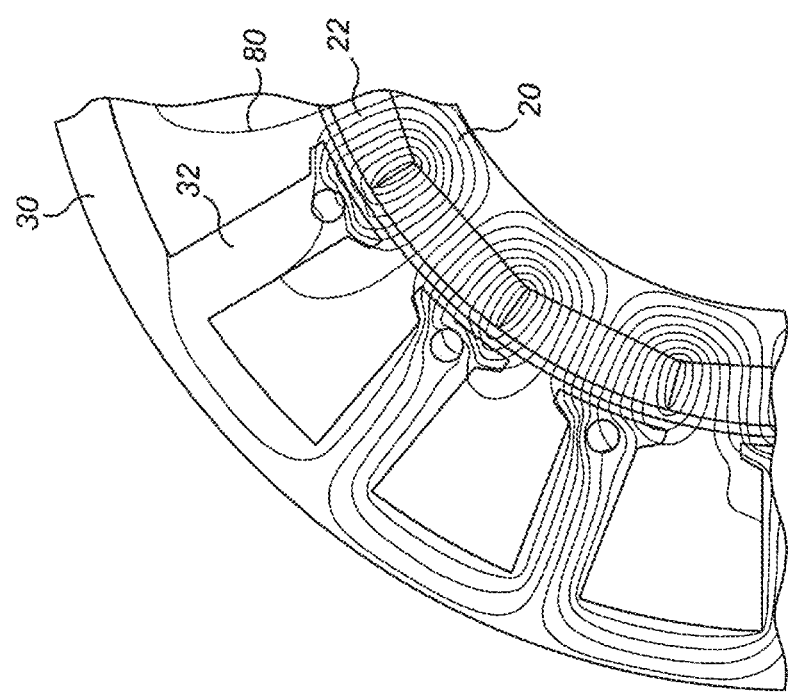
FIG. 3A shows magnetic field lines around damper bars of a known electric motor.

Embedding damper bars inside the stator teeth, such as in the known examples of FIGS. 1, 2 and 3A, allows for more space for windings and simplifies the mounting of the damper bars. However, the damper bars also reduce the strength of the teeth by taking up space that would otherwise be filled with the stator tooth material.

In the example shown in FIG. 1, each damper bar 34 has a generally circular cross-section. Further, within its respective stator tooth 32, each damper bar 34 is disposed on a radially extending axis of symmetry of that stator tooth 32. In an alternative (not shown), the damper bars may be disposed off an axis of symmetry of the stator tooth.

Figure 5:
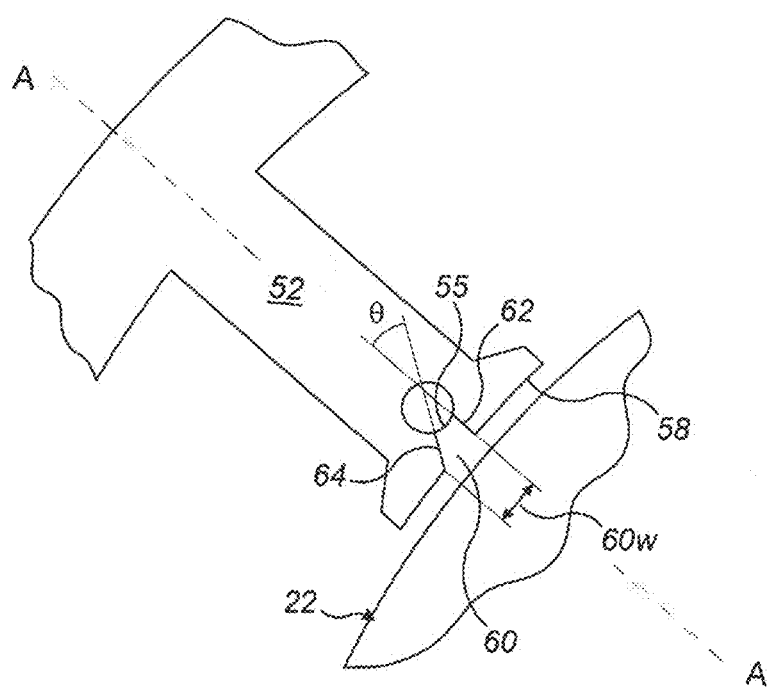
FIG. 5 shows a detailed view of a stator tooth of the electric motor of FIG. 3B.

In the example shown in FIGS. 1, 2 and 5, each damper bar 34 has a circular cross section along the length of the damper bar 34. Other shapes of damper bar 34, 35 are also known in the art. For example, the damper bars may have a square cross section, a rectangular cross section, an oval cross section etc.

FIG. 3A shows a section of the known electric motor 10 of FIG. 1 with simulated magnetic field lines 80 displayed thereon. In this figure, the windings 36 that are shown in FIG. 1 have been removed for clarity. The interaction of the magnetic field lines 80 between the magnets 22 of the rotor 20 and the damper bars 34 may be seen.

In comparison to the known rotors, however, it has now been found that damping may be increased, for the same cross-sectional area of each damper bar 34, by increasing the flux linkage between the magnetic fields of the rotor magnets 22 and the damper bars 34.

An electric motor 50 according to the present disclosure which achieves this improvement is therefore now shown in partial cross-section in FIG. 3B. This electric motor 50 is substantially the same as the known electric motor 10 except for the presence of a groove 60 in each of the stator teeth 52, as described in detail below.

The electric motor 50 has a plurality of teeth 52 extending radially inwards towards the rotor 20. Each stator tooth 52 has a face 58 that faces towards, or in the direction of, the rotor 20.

Each stator tooth 52 has a damper bar 54 partially embedded therein. Each damper bar 54 is made from an electrically-conductive, non-magnetic material. The plurality of damper bars 54 are connected together by an electrically conductive element (not shown, but this may be provided by a ring 35, as shown in FIG. 2).

A groove 60 is formed in the face 58 of the stator tooth 52 that faces the direction of the rotor 20. The groove 60 extends axially along the length of the stator tooth 52, i.e. parallel to the axis of rotation of the rotor. The groove 60 is sufficiently deep so as to expose a portion of the outer surface 55 of the damper bar 54. In some examples, this may provide a line-of-sight between that portion of the surface of the damper bar 34 and one or more magnets 22 of the rotor. That is, the groove 60 may be formed by removing material of the stator tooth 54 such that there is no stator tooth material present between the portion of the damper bar 54 and the rotor magnets 22.

In contrast to the known examples, wherein the bar is completely embedded in the stator tooth, this example only has the bar partially embedded in the tooth (due to the presence of the groove).

Figure 4:
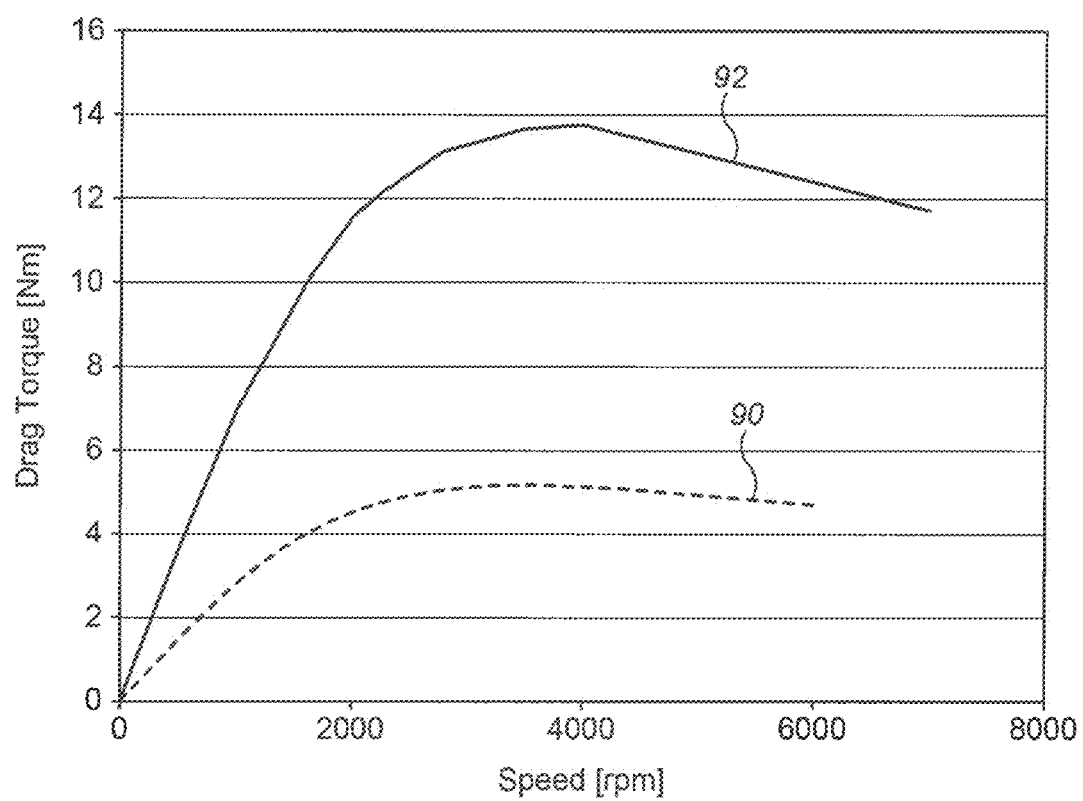
FIG. 4 shows a graph of the damping torque vs. motor speed for two electric motors.

It has been found that this groove greatly improves the electromagnetic coupling between the damper bar 54 and the rotor magnets 22. The graph in FIG. 4 shows two lines on a graph of drag torque (caused by the damper bars) against motor speed. The first, lower, line 90 shows the drag torque caused by the damper bars 34 in the known electric motor 10. In this example, the maximum drag torque is approximately 5 Nm at a motor speed of approximately 3500 rpm. The second, higher, line 92 shows the drag torque in an electric motor 50 having the grooves 60 described above. In this example, the maximum drag torque is nearly 14 Nm at a motor speed of approximately 4000 rpm. Other than the grooves 60, the motor 10 of the first line 90 and the motor 50 of the second line 92 are identical. In particular, the two motors 10, 50, have identical damper bars 34, 54. Thus, providing the grooves 60 can result in an approximately threefold (3×) increase in the drag torque, ceteris paribus.

The grooves 60 may be varied according to the required drag torque. In particular, the width 60w of the groove may be varied according to the desired maximum drag torque.

FIG. 5 shows an enlarged view of a single tooth 52 having a groove 60. The groove 60 has first 62 and second 64 walls. The walls 62, 64 extend from the face 38 of the stator tooth 52 to the surface of the damper bar 54. In between the two walls 62, 64, a portion 55 of the surface of the damper bar 54 is exposed.

In the example shown in FIG. 5, the damper bar 54 has a generally circular cross-section and the exposed portion 54 of the damper bar subtends an angle of approximately thirty (30) degrees of the circular cross-section. Of course, other cross-sectional shapes of the damper bar 54 are envisaged.

In FIG. 5, the first wall 62 extends in a substantially radial direction. The second wall 64 extends at an angle θ to the radial direction. Thus, the distance between the two walls 62, 64 varies along the radial direction. That is, the radially inner side of the groove 60, nearest the rotor 20, is wider than the radially outer side of the groove 60 adjacent the damper bar 54. In this case, the width 60w is defined as the width of the groove 60 at the radially innermost side of the tooth 52.

In other embodiments, both walls 62, 64 of the groove 60 may be substantially radial. In other embodiments, both walls 62, 64 may extend at an angle to the radial direction.

The shaping of the groove 60 can be varied. The shape of the slot profile may affect the amount of drag torque generated. Thus, the drag torque may be optimized for a given electric motor intended for a particular use through selection of the shape of the groove 60.

Figure 6:
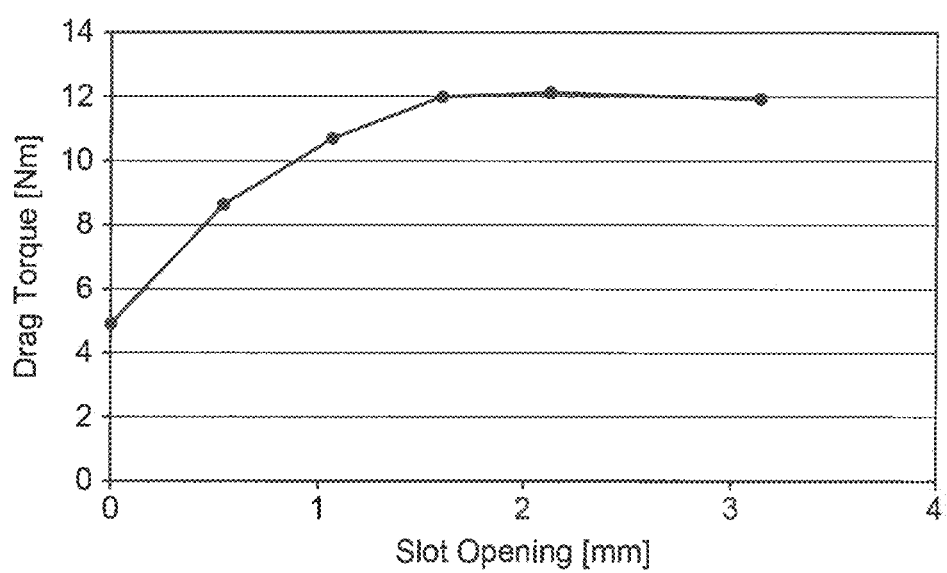
FIG. 6 shows a graph of the damping torque vs. slot size for a given motor speed.
Figure 7:
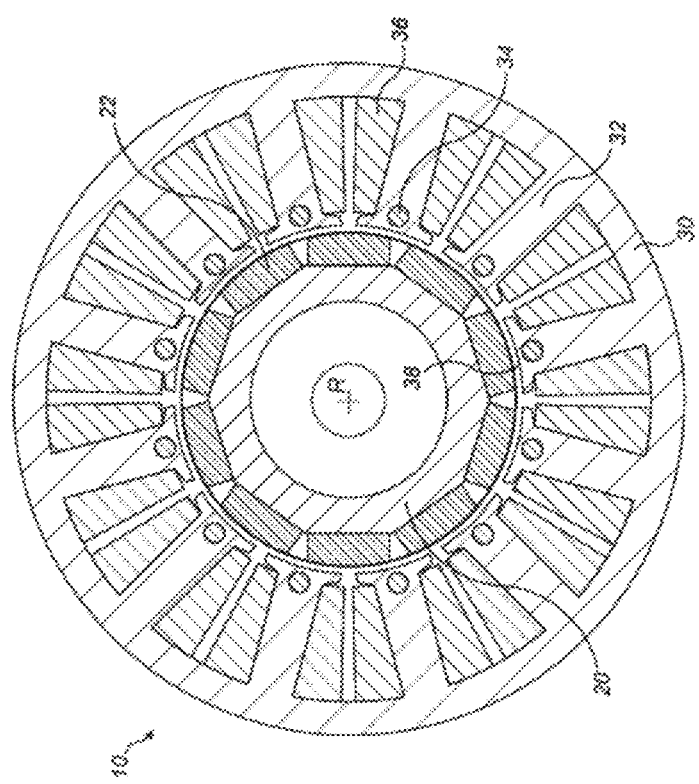
FIG. 7 shows a cross-section of the fully enclosed end portion of the damper bar according to the invention.

FIG. 6 depicts a graph of the drag torque generated against the width (in the circumferential direction of the stator) of the grooves, at constant motor speed. In this example, the grooves are symmetrical, having substantially radially oriented side walls. As may be seen from the Figure, with zero width (i.e. no groove present) the drag torque in this motor, at speed X, is 5 Nm. When a groove having a slot opening of 0.55 mm is formed, the drag torque in this motor, at speed X, is nearly 9 Nm. At a slot width of 1.05 mm, the drag torque is nearly 11 Nm at speed X. The amount of drag torque then plateaus at approximately 12 Nm for groove widths of 1.6 mm and above.

Thus, the designer can select a desired drag torque within this 2.5× range (5 Nm→12 Nm) by selecting an appropriate slot width while keeping all other parameters (e.g. materials, size of damper bars, etc.) of the motor the same.

The invention claimed is:

1. An electric motor comprising:
a stator and a rotor being arranged coaxially, with said rotor provided internally of said stator;
said stator having one or more stator teeth extending radially inwardly towards said rotor;
said rotor having a plurality of magnets forming an outer rotor surface;
wherein a first face of the or each stator tooth faces in the direction of the outer rotor surface, and
an electrically-conductive non-magnetic damper bar partially embedded in the or each stator tooth, the or each damper bar having an outer damper bar surface;
wherein a groove is formed in the first face of the or each stator tooth to expose a portion of the outer damper bar surface; and wherein at either end of the damper bar, the damper bar is fully enclosed around its circumference by the stator tooth for a portion of the length of the damper bar, such that the groove in the stator tooth extends less than the total length of the damper bar within the stator tooth.

2. The electric motor according to claim 1, wherein the groove is formed such that there is a line-of-sight between a portion of the damper bar surface and a portion of the rotor surface.

3. The electric motor according to claim 1, further comprising a plurality of said stator teeth and further comprising an electrical conductor connected to each of the damper bars.

4. The electric motor according to claim 1, wherein the, or each, groove is sized so as to expose between 1% and 49% of the cross-sectional outer surface of the damper bar, with the remaining portion being embedded in the stator tooth.

5. The electric motor according to claim 3, wherein one or more end portions of the damper bar are connected to the electrical conductor.

6. The electric motor according to claim 1, wherein each stator tooth has a central axis A extending in said radial direction and wherein the damper bar is disposed perpendicularly to said central radial axis A so as to intersect said radial axis A.

7. The electric motor according to claim 6 wherein said central radial axis A is a central axis of symmetry and wherein a cross-section of said damper bar is symmetrical about the axis of symmetry A.

8. The electric motor according to claim 1, wherein the stator and rotor are arranged coaxially, one inside the other, to define a cylindrical geometry having orthogonal radial, circumferential, and axial directions; and wherein the or each groove is defined by two side walls, wherein a first of the side walls extends substantially radially towards the rotor, and wherein a second of the side walls extends at an angle, theta, to the radial direction.

9. The electric motor according to claim 8, wherein theta is between 20 and 50 degrees to the radial direction.

10. The electric motor according to claim 1, wherein the rotor is configured to rotate around a central axis of rotation R, wherein the stator teeth extend radially towards the axis of rotation R, and wherein a longitudinal axis of each damper bar extends parallel to the axis of rotation R.

11. The electric motor according to claim 1, wherein the groove extends along more than 50% of the length of the long axis of the damper bar.

12. The electric motor of claim 1 wherein the groove extends more than 90% of the length of the long axis of the damper bar.

13. A method of making an electric motor, the method comprising:
positioning a rotor coaxially and concentrically within a stator, the stator having at least one stator tooth extending radially inwards towards said rotor such that a first face of the stator tooth faces towards the rotor, wherein a conductive non-magnetic damper bar is embedded in the stator tooth, and
providing a groove in the first face of the stator tooth whereby, at either end of the damper bar, the damper bar is fully enclosed around its circumference by the stator tooth for a portion of the length of the damper bar, such that the groove in the stator tooth extends less than the total length of the damper bar within the stator tooth, so as to expose only a portion of the length of a long axis of an outer surface of the damper bar.

14. The method of claim 13 further comprising providing said groove so that it is sized so as to expose between 1% and 49% of the cross-sectional outer surface of the damper bar, with the remaining portion of the damper bar outer surface being embedded in the stator tooth.

* * * * *